June 21, 1966   R. I. ANDRUSHKIW ETAL   3,257,616
EXPANDED-SCALE R.M.S. ELECTRICAL MEASURING DEVICE
Filed Sept. 11, 1961
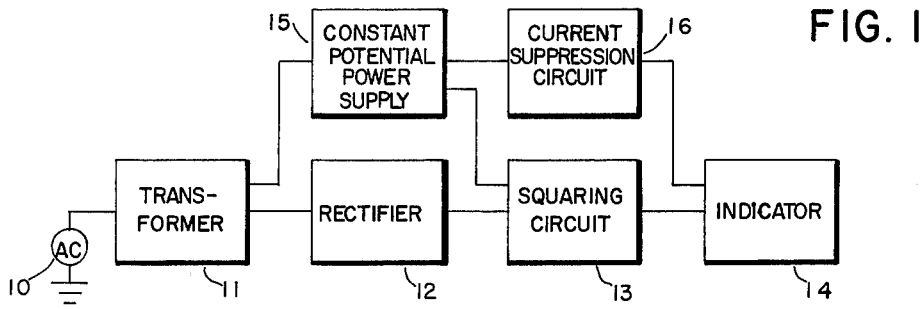
FIG. 1
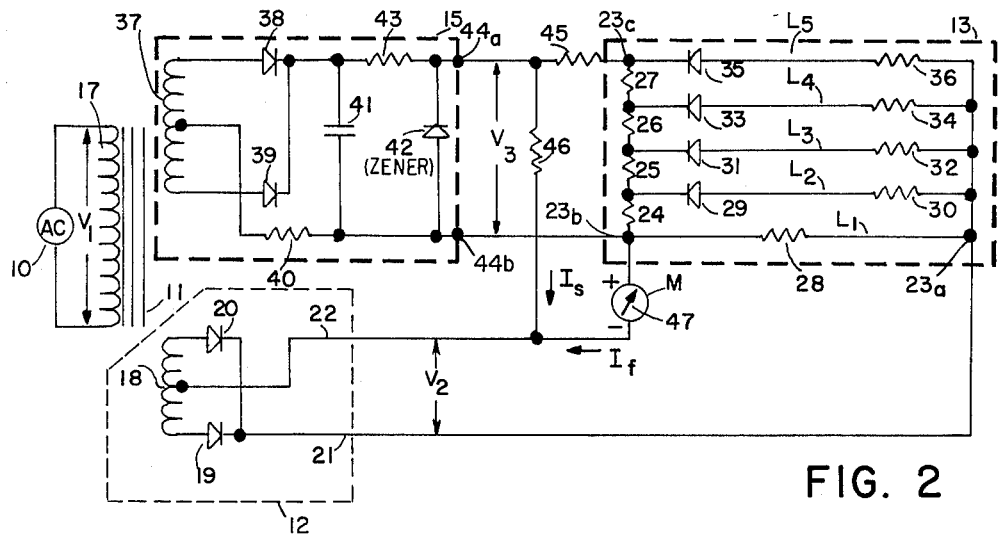
FIG. 2
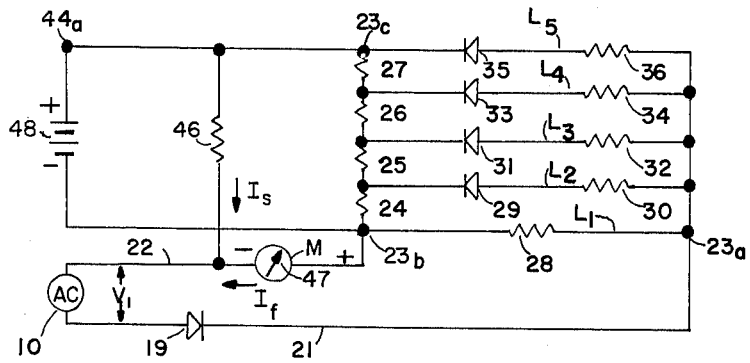
FIG. 3
ROMAN I. ANDRUSHKIW
RICHARD P. SHAKE
JOHN NAGY, JR.
INVENTORS
BY 
ATTORNEY

United States Patent Office 3,257,616
Patented June 21, 1966

3,257,616
EXPANDED-SCALE R.M.S. ELECTRICAL
MEASURING DEVICE
Roman I. Andrushkiw, Newark, John Nagy, Jr., Union, and Richard P. Schake, Livingston, N.J., assignors to Weston Instruments, Inc., a corporation of Texas
Filed Sept. 11, 1961, Ser. No. 137,280
4 Claims. (Cl. 324—131)

This invention relates to measuring devices and more particularly to means for measuring electrical quantities of an alternating character.

It is desirable to employ a D.C. instrument for indicating root-mean-square values of an A.C. quantity in a range between a predetermined value greater than zero and some higher value. Devices for measuring such a range of values, whether they indicate root-mean-square values or average values are known generally in the art as expanded scale meters. However, the devices presently available have a number of disadvantages. One of the most serious disadvantages is that such devices are accurate only for the particular waveforms for which they are calibrated. Accordingly, a given meter can be calibrated to accurately indicate root-mean-square values for an input signal having a given waveform; however, when the waveform is substantially modified, the meter no longer provides an accurate indication.

Another disadvantage of present devices is that they are accurate only for an extremely narrow frequency range, the accuracy of indication being considerably affected under normally encountered variations in the frequency of the input signal. Further, the preferred prior art arrangement utilizes an incandescent bulb and therefore the device is incapable of withstanding high shock impact. Additionally the bulb inherently has a limited life which requires frequent bulb changes, and, as a result, also requires frequent recalibration.

It is therefore an object of this invention to provide a device of the character described which produces an accurate root-mean-square indication for input signals of varying waveforms.

Another object is to provide an expanded scale instrument which will more accurately indicate input signal root-mean-square values over a wider frequency range than prior art instruments.

Still another object is to provide an instrument of the type described which has a longer life and a higher resistance to shock than known instruments of this type.

All of the objects, features, and advantages of the invention will be best understood from a study of the following detailed description taken in conjunction with the claims and with the drawings in which:

FIG. 1 shows a block form diagram of the major components of one embodiment of the invention and their relationship to each other, FIG. 2 shows a schematic wiring diagram corresponding to the block form embodiment of FIG. 1, and FIG. 3 shows a schematic wiring diagram of an alternative embodiment of the invention.

Briefly, the invention comprises an arrangement for measuring the root-mean-square value of an alternating current input signal which includes a transformer having a primary connected to receive this signal. The transformer has a secondary winding which is connected to a first rectifying arrangement for providing a rectified signal proportional to the value of the input signal to a meter or indicator. A squaring circuit is provided to facilitate accurate indication of root-mean-square values by the meter and is connected in series with the meter to receive the rectified signal. A constant potential power supply is also provided for delivering a biasing potential to the squaring circuit. This circuit includes, in one form of the invention, an additional secondary winding on the transformer in combination with a second rectifying arrangement and a voltage regulator. A current suppression circuit, connected to the output of the constant potential power supply is further provided to suppress current through the meter at a predetermined input signal value.

According to an alternative form of the invention, the transformer may be eliminated, in which case the input signal is fed directly to the meter circuit instead of to the transformer primary. With such an arrangement, the second rectifier and regulator included in the constant potential power supply may also be eliminated, and any suitable constant potential source, such as, for example, a battery, may be substituted therefor.

Referring now to FIG. 1, the electrical quantity to be measured, such as, for example, a potential from an A.C. source 10, is applied to a transformer 11 and a potential proportional thereto is then fed to a rectifier 12, a squaring circuit 13 and then to a suitable indicator 14. A constant potential power supply 15 is provided for delivering a biasing potential to the squaring circuit 13 and also for delivering potential to a current suppression circuit 16 connected to the indicator 14.

With reference now to FIG. 2, an input signal potential $V_1$ from the A.C. source 10 is shown applied to the primary 17 of the transformer 11. A secondary winding 18 of the transformer is connected to a pair of rectifying diodes 19 and 20 for providing a rectified potential $V_2$ between the wires 21 and 22. The wire 21 is connected to one input terminal 23a of the squaring circuit 13, another input terminal 23b being connected to the wire 22 in series with the indicator 14. This indicator may be, for example, a 0–1 milliampere meter M of the d'Arsonval type.

The squaring circuit 13, when employed with a meter of this type will accurately indicate root-mean-square values of the signal to be measured. The squaring circuit further includes a pair of bias terminals 23b and 23c for receiving a suitable biasing potential, as will later appear. A potential dividing network comprising resistors 24, 25, 26, and 27 is connected between the bias terminals 23b and 23c. The squaring circuit also includes a number of circuit legs, one leg $L_1$ comprising a single resistor 28 connected between the input terminals 23a and 23b. Four additional circuits legs, each comprising a diode in series with a resistor, are connected between the potential dividing network 24–27 and the terminal 23a. Accordingly, the diode 29 and resistor 30 comprise a series leg, $L_2$, connected between the juncture of resistors 24–25 and the terminal 23a; the leg $L_3$ comprising 31 and 32 is connected between the juncture of 25–26 and the terminal 23a; the leg $L_4$ comprising 33 and 34 is connected between the juncture of 26–27 and the terminal 23a; and the leg $L_5$ comprising 35 and 36 is connected between the terminal 23a and the terminal 23c.

The constant potential power supply 15 comprises a secondary winding 37 on the transformer 11, a pair of rectifiers 38 and 39, a resistance-capacitance filter 40–41, and a Zener diode 42 in combination with a current limiting resistor 43 for limiting the current through the diode. This circuit is designed to provide a regulated D.C. potential $V_3$ at the power supply output terminals 44a–44b which is independent of variations in the input signal value from the source 10.

The potential from the output terminals 44a–44b is connected to the bias terminals 23b–23c through a resistor 45. This resistor would not be necessary if the output potential at the terminals 44a–44b were the same value as that required at the terminals 23b–23c. However, since the Zener diode 42 primarily determines the output potential level and since it is not always possible to obtain a diode having the precise Zener or breakdown potential desired, it is better practice to use a diode which will provide a larger voltage than required and reduce it by the use of the dropping resistor 45.

The current suppression circuit indicated by the block 16 in FIG. 1 includes a resistor 46 for suppressing or cancelling the forward current $I_f$ through the meter M when the potential $V_1$ from the source 10 is a given value corresponding to the minimum meter scale figure indicated by the meter pointer 47 when in its undeflected position. This resistor is connected to one terminal 44a of the constant potential power supply 15 and is connected in series with the meter to the other terminal 44b. The value of this resistor is determined by the desired suppression current $I_s$, which current should be equal in value and opposite in direction to the forward current $I_f$ through the meter. This will cause the meter pointer to be at its zero current or undeflected position for a given minimum input voltage $V_1$ which will also be the lowest voltage indicated on the meter scale. The suppression of the forward meter current makes possible the expanded scale feature of the invention whereby the minimum scale figure is some value other than zero. This will be clear from the following description of operation.

Assuming it is desired to measure potentials between 105 and 125 volts from the A.C. source 10, the scale of the meter M would be calibrated so that the pointer would indicate 105 volts when there is no current flowing through the meter and 125 volts when the full current is flowing. At a $V_1$ voltage input of 105 volts, the voltage $V_2$, which is proportional to $V_1$, would cause a given forward meter current $I_f$, such as, for example, 2 milliamperes, to flow through the meter. In order for the pointer to be at the zero current or undeflected position so as to indicate 105 volts, the value of the resistor 46 would be selected so that the suppression current $I_s$ would be exactly equal to the forward meter current $I_f$ of 2 milliamperes. Since the potential at the power supply output terminals 44a–44b is constant the current $I_s$ will also remain constant. Accordingly, any change in the input signal potential $V_1$ to a value above 105 volts will cause a proportional change in the voltage $V_2$ causing the net current through the meter M to become greater than zero so that the meter, when calibrated, will accurately indicate this new value.

The operation of the squaring circuit is such that when the proper bias value is applied to the terminals 23b–23c, the legs $L_2$, $L_3$, $L_4$ and $L_5$, each of which is biased at a different level, become sequentially conductive and nonconductive during each rectified wave of the signal applied to the input terminals 23a–23b. As a result, a value of forward or actuating current is applied to the meter M which is proportional to the mean-square value of this applied voltage. The meter can then be calibrated to indicate root-mean-square values of the input signal potential $V_1$. A greater or lesser number of legs may be provided depending upon the accuracy desired.

FIG. 3 shows an alternative embodiment to that of FIGS. 1 and 2 wherein like numerals indicate like parts. In this figure it will be noted that the transformer 11 has been eliminated and that the potential $V_1$ to be measured is applied directly to the meter circuit rather than being transformer coupled. Only half wave rectification is achieved by the diode 19 of FIG. 3, however full wave rectification can be employed if desired by utilizing for example the well known bridge rectifier circuit. The constant potential power supply 15 in the form shown in FIG. 2 has also been eliminated and any other suitable substantially constant potential supply such as the battery 48 may be employed instead. It is obvious that the circuit of this embodiment functions in the manner described above with regard to FIG. 2.

This invention provides a number of important advantages over the arrangements known in the prior art. One of the most important of these is that our device is capable of producing a far more accurate root-mean-square indication of input signal values, and extremely high accuracy is now possible simply by employing additional legs in the squaring circuit. Furthermore, our device is relatively insensitive to wave shape so that it can very accurately measure the values of input signals having waveforms which vary substantially with respect to one another. Additionally, the instrument described above is not subject to inaccuracies of indication for input signals of varying frequency as is the case in the prior art. Further, our device has an inherently longer life and can withstand far greater shock than prior art arrangements. Still another advantage is that the power dissipation is less. Our device can of course be easily adapted to measure alternating current by providing a voltage $V_1$ which is proportional to the value of the current to be measured. This could be accomplished for example by removing the source 10 in FIG. 3 and connecting in its place a resistor through which the current to be measured is passed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. Expanded-scale measuring apparatus for determining the value of an alternating electrical signal comprising:
   circuit means for supplying the alternating signal to be measured;
   rectifier circuit means for converting the alternating signal to a direct current;
   a direct-current meter coupled in series with the rectifier circuit means with a polarity such that the rectifier direct current will flow through the meter in a positive direction;
   circuit means for supplying a substantially constant direct current will flow through the meter in a
   circuit means shunting the constant potential supply circuit means across the meter for producing a substantially constant direct current flow through the meter in a negative direction thereby to balance out a predetermined portion of the rectifier direct current;
   a diode function former network coupled in series with the rectifier circuit means and the meter for causing the magnitude of the rectifier direct current to vary as a function of the square of the magnitude of the alternating signal;
   and circuit means coupled to the constant potential supply circuit means for supplying diode biasing voltage to the function former network.

2. Expanded-scale measuring apparatus for determining the value of an alternating electrical signal comprising:
   circuit means for supplying the alternating signal to be measured;
   first rectifier circuit means for converting the alternating signal to a direct current;
   a direct-current meter coupled in series with the first rectifier circuit means with a polarity such that the first rectifier direct current will flow through the meter in a positive direction;
   second rectifier circuit means responsive to the alternating signal for developing a substantially constant direct-current potential;
   circuit means connecting the constant potential output of the second rectifier circuit means across the meter for producing a substantially constant direct current flow through the meter in a negative direction thereby to balance out a predetermined portion of the first rectifier direct current;

a diode function former network coupled in series with the first rectifier circuit means and the meter for causing the magnitude of the first rectifier direct current to vary as a function of the square of the magnitude of the alternating signal;

and circuit means coupled to the second rectifier circuit means for supplying diode biasing voltage to the function former network.

3. Expanded-scale measuring apparatus for determining the value of an alternating electrical signal comprising:

circuit means for supplying the alternating signal to be measured;

a series circuit including in series therein rectifier circuit means for converting the alternating signal to a direct current, a direct-current meter and a first impedance element, the meter being connected with a polarity such that the rectifier direct current will flow through the meter in a positive direction;

circuit means for supplying a substantially constant direct-current potential;

circuit means connecting the constant potential supply circuit means across the meter for producing a substantially constant direct current flow through the meter in a negative direction thereby to balance out a predetermined portion of the rectifier direct current;

a tapped voltage divider connected across the constant potential supply circuit means;

and a plurality of two-terminal circuit branches having a first terminal of each branch connected to the side of the first impedance element which is more remote from the meter and having the different second terminals thereof connected to different ones of the taps on the voltage divider, each of these circuit branches including a diode device in series with an impedance element.

4. Expanded-scale measuring apparatus for determining the value of an alternating signal comprising:

an input transformer having a primary winding for receiving the alternating signal to be measured and first and second secondary windings;

a series circuit including in series therein first rectifier circuit means for converting the alternating signal appearing across the first secondary winding to a direct current, a direct-current meter and a first resistor, the meter being connected with a polarity such that the first rectifier direct current will flow through the meter in a positive direction;

second rectifier circuit means coupled to the second secondary winding and including voltage regulator means for developing a substantially constant direct-current potential;

circuit means connecting the constant potential output of the second rectifier circuit means across the meter for producing a substantially constant direct current flow through the meter in a negative direction thereby to balance out a predetermined portion of the first rectifier direct current;

a tapped voltage divider connected across the constant potential output of the second rectifier circuit means;

and a plurality of two-terminal circuit branches having a first terminal of each branch connected to the side of the first resistor which is more remote from the meter and having the different second terminals thereof connected to different ones of the taps on the voltage divider, each of these circuit branches including a diode device in series with a resistor.

References Cited by the Examiner

UNITED STATES PATENTS

| | | | |
|---|---|---|---|
| 2,481,500 | 9/1949 | Crowl | 324—131 |
| 2,810,107 | 10/1957 | Sauber | 324—132 |
| 3,024,415 | 3/1962 | Burklund | 324—131 |

WALTER L. CARLSON, *Primary Examiner.*

FREDERICK M. STRADER, *Examiner.*

R. V. ROLINEC, *Assistant Examiner.*